United States Patent
Cheng

(10) Patent No.: US 10,495,197 B2
(45) Date of Patent: Dec. 3, 2019

(54) CONTINUOUSLY VARIABLE TRANSMISSION RING DRIVING MECHANISM

(71) Applicant: MOTIVE POWER INDUSTRY CO., LTD., Dacun Township (TW)

(72) Inventor: Hsin-Lin Cheng, Dacun Township (TW)

(73) Assignee: MOTIVE POWER INDUSTRY CO., LTD. (TW)

( * ) Notice: Subject to any disclaimer, the term of this patent is extended or adjusted under 35 U.S.C. 154(b) by 239 days.

(21) Appl. No.: 15/811,769

(22) Filed: Nov. 14, 2017

(65) Prior Publication Data
US 2018/0223970 A1    Aug. 9, 2018

(30) Foreign Application Priority Data
Feb. 7, 2017 (TW) .............................. 106103869 A

(51) Int. Cl.
F16H 15/40    (2006.01)
(52) U.S. Cl.
CPC .................... *F16H 15/40* (2013.01)
(58) Field of Classification Search
CPC ...................................................... F16H 15/40
See application file for complete search history.

(56) References Cited

U.S. PATENT DOCUMENTS

| | | | | |
|---|---|---|---|---|
| 4,386,536 | A * | 6/1983 | Kraus | F16H 15/38 476/10 |
| 5,138,894 | A * | 8/1992 | Kraus | F16H 15/38 475/192 |
| 5,597,056 | A * | 1/1997 | Blake | B62M 11/12 192/217.4 |
| 7,914,029 | B2 * | 3/2011 | Miller | B62M 9/08 280/261 |
| 8,360,917 | B2 * | 1/2013 | Nichols | B62M 11/16 475/189 |
| 8,512,195 | B2 * | 8/2013 | Lohr | F16H 15/28 475/189 |

(Continued)

*Primary Examiner* — David M Fenstermacher
(74) *Attorney, Agent, or Firm* — Schmeiser, Olsen & Watts, LLP

(57) ABSTRACT

A continuously variable transmission ring driving mechanism, including a cylinder having a ring-shaped recess with a ring-shaped bottom-wall and two ring-shaped sidewalls, the ring-shaped bottom-wall having axial guide-holes each for receiving a continuously variable transmission rod; rollers pivotally disposed at the ring-shaped bottom-wall and the ring-shaped sidewalls and exposed partially from the ring-shaped recess; and a continuously variable transmission annular unit movably received in the ring-shaped recess, wherein an inner ring-shaped surface of the continuously variable transmission annular unit is in contact with the rollers of the ring-shaped bottom-wall, and two opposing ring-shaped surfaces of the continuously variable transmission annular unit are in contact with the rollers of the ring-shaped sidewalls, the continuously variable transmission annular unit having oblique guide-holes, allowing the oblique guide-holes to guide the continuously variable transmission rod along axial direction of the cylinder when the continuously variable transmission annular unit rotates about the cylinder.

4 Claims, 6 Drawing Sheets

(56) References Cited

U.S. PATENT DOCUMENTS

| | | | |
|---|---|---|---|
| 2007/0155580 A1* | 7/2007 | Nichols | F16H 15/28 476/36 |
| 2009/0082169 A1* | 3/2009 | Kolstrup | F16H 15/28 476/38 |
| 2012/0085189 A1* | 4/2012 | Coe | F16H 3/426 74/415 |
| 2015/0024899 A1* | 1/2015 | Phillips | F16H 15/28 476/37 |

* cited by examiner

CONTINUOUSLY VARIABLE TRANSMISSION RING DRIVING MECHANISM

CROSS-REFERENCE TO RELATED APPLICATION

This non-provisional application claims priority under 35 U.S.C. § 119(a) on Patent Application No(s). 106103869 filed in Taiwan, R.O.C. on Feb. 7, 2017, the entire contents of which are hereby incorporated by reference.

FIELD OF THE INVENTION

The present invention relates to continuously variable transmission ring driving mechanisms and, more particularly, to a continuously variable transmission ring driving mechanism with low friction loss and thus high efficiency of variable transmission.

BACKGROUND OF THE INVENTION

To adjust speed and reduce gasoline consumption, every conventional vehicle is equipped with a gear shifting mechanism. The conventional gear shifting mechanism includes a gear train, a combination of a gear train and oil channels, a combination of a pulley block and a belt, or a variable transmission sphere rotatable by a variable transmission rod. The gear shifting mechanism which includes a variable transmission sphere rotatable by a variable transmission rod is disadvantaged by high friction loss incurred in driving variable transmission. Therefore, it is important to provide a continuously variable transmission ring driving mechanism capable of reducing friction loss in order to enhance variable transmission efficiency.

SUMMARY OF THE INVENTION

In view of the aforesaid drawbacks of the prior art, the inventor of the present invention conceived room for improvement in the prior art and thus conducted extensive researches and experiments according to the inventor's years of experience in the related industry, and finally developed a continuously variable transmission ring driving mechanism with low friction loss and thus high efficiency of variable transmission.

The present invention provides a continuously variable transmission ring driving mechanism, comprising: a cylinder having a ring-shaped recess, the ring-shaped recess having a ring-shaped bottom wall and two ring-shaped sidewalls, the ring-shaped bottom wall having a plurality of axial guide holes each for receiving a continuously variable transmission rod; a plurality of rollers pivotally disposed at the ring-shaped bottom wall and the ring-shaped sidewalls and exposed partially from the ring-shaped recess; and a continuously variable transmission annular unit movably received in the ring-shaped recess, wherein an inner ring-shaped surface of the continuously variable transmission annular unit is in contact with the rollers of the ring-shaped bottom wall, and two opposing ring-shaped surfaces of the continuously variable transmission annular unit are in contact with the rollers of the ring-shaped sidewalls, the continuously variable transmission annular unit having a plurality of oblique guide holes, allowing the oblique guide holes to guide the continuously variable transmission rod along an axial direction of the cylinder when the continuously variable transmission annular unit rotates about the cylinder.

Regarding the continuously variable transmission ring driving mechanism, the cylinder has two half-cylinders connected together, the half-cylinders each having a half ring-shaped bottom wall, a plurality of half axial guide holes and the ring-shaped sidewalls.

The continuously variable transmission ring driving mechanism further comprises a driving source for driving the continuously variable transmission annular unit to rotate about the cylinder.

Regarding the continuously variable transmission ring driving mechanism, at least one arcuate driving gear rack is disposed on an outer ring-shaped surface of the continuously variable transmission annular unit and extended in a direction of rotation thereof, and the driving source has at least one driving gear meshing with the arcuate driving gear rack.

Hence, the continuously variable transmission ring driving mechanism of the present invention has low friction loss and thus high efficiency of variable transmission.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
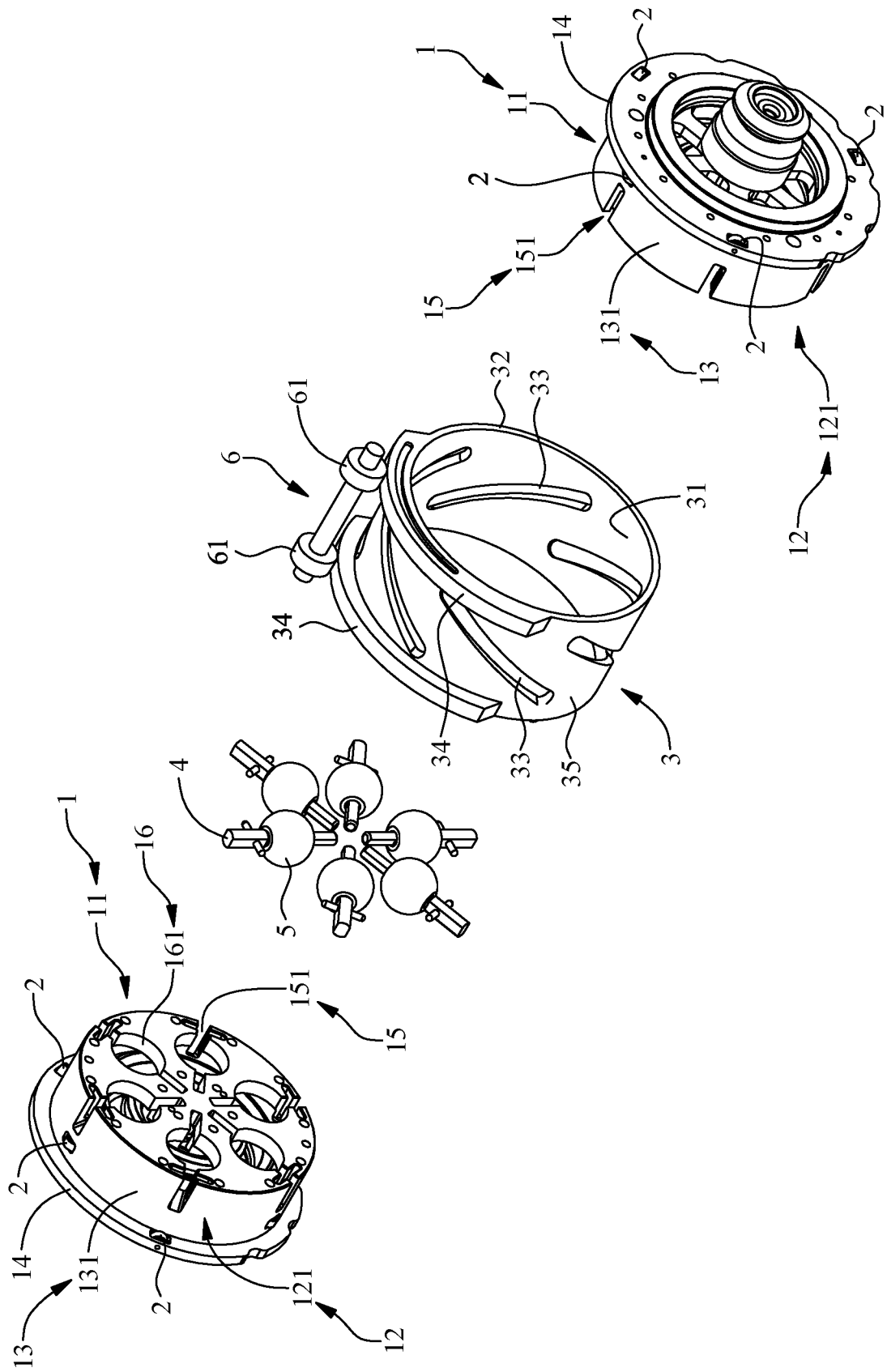
FIG. 1 is an exploded view 1 of a continuously variable transmission ring driving mechanism according to a preferred embodiment of the present invention.

Referring to FIG. 1 through FIG. 6, the present invention provides a continuously variable transmission ring driving mechanism which comprises a cylinder 1, a plurality of rollers 2 and a continuously variable transmission annular unit 3. A ring-shaped recess 12 is disposed at the rim of the cylinder 1. The ring-shaped recess 12 has a ring-shaped bottom wall 13 and two ring-shaped sidewalls 14. The ring-shaped sidewalls 14 flank the ring-shaped bottom wall 13 and extend outward from the ring-shaped bottom wall 13 in the radial direction of the cylinder 1. The ring-shaped bottom wall 13 has a plurality of axial guide holes 15. The axial guide holes 15 run parallel and are equally spaced apart. The axial guide holes 15 each elongate in the axial direction of the cylinder 1 and have a cruciform radial cross section. The axial guide holes 15 each receive a cruciform continuously variable transmission rod 4. The continuously variable transmission rods 4 are each pivotally connected to a continuously variable transmission sphere 5. The rollers 2 are pivotally disposed at the ring-shaped bottom wall 13 and the ring-shaped sidewalls 14. The rollers 2 are exposed partially from the ring-shaped recess 12. The rollers 2 pivotally disposed at the ring-shaped bottom wall 13 are equally spaced apart. The rollers 2 pivotally disposed at the ring-shaped sidewalls 14 are equally spaced apart. The continuously variable transmission annular unit 3 is movably received in the ring-shaped recess 12. An inner ring-shaped surface 31 of the continuously variable transmission annular unit 3 is in contact with the rollers 2 of the ring-shaped bottom wall 13. Two lateral ring-shaped surfaces 32 of the continuously variable transmission annular unit 3 are in contact with the rollers 2 of the ring-shaped sidewalls 14. The continuously variable transmission annular unit 3 has a plurality of oblique guide holes 33. The oblique guide holes 33 run parallel and are equally spaced apart. The oblique guide holes 33 are oblique relative to the rotational axis of the continuously variable transmission annular unit 3 and oblong. As soon as the continuously variable transmission annular unit 3 rotates about the cylinder 1, the oblique guide holes 33 guide the continuously variable transmission rod 4 along the axial direction of the cylinder 1, allowing the continuously variable transmission sphere 5 to turn, thereby effectuating continuously variable transmission.

Figure 3:
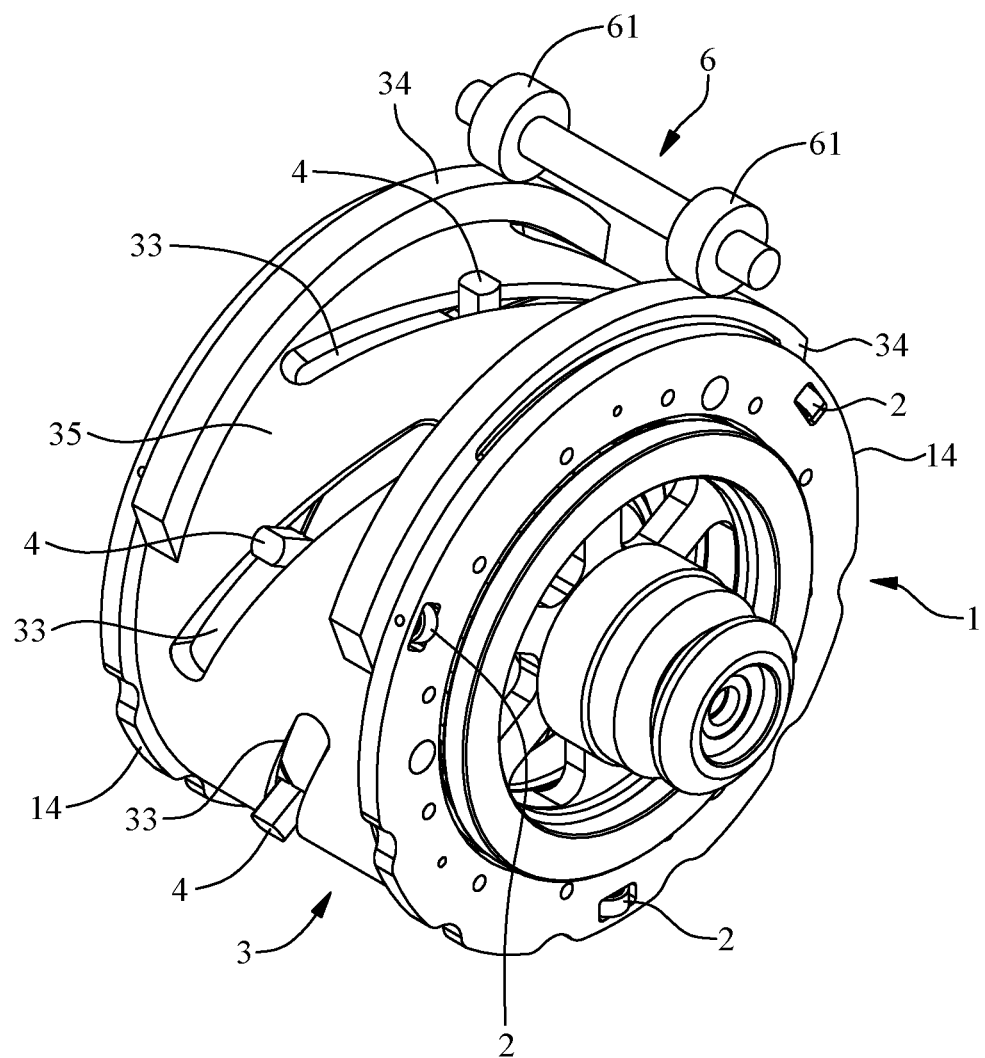
FIG. 3 is a schematic view 1 of the continuously variable transmission ring driving mechanism assembled according to a preferred embodiment of the present invention.
Figure 4:
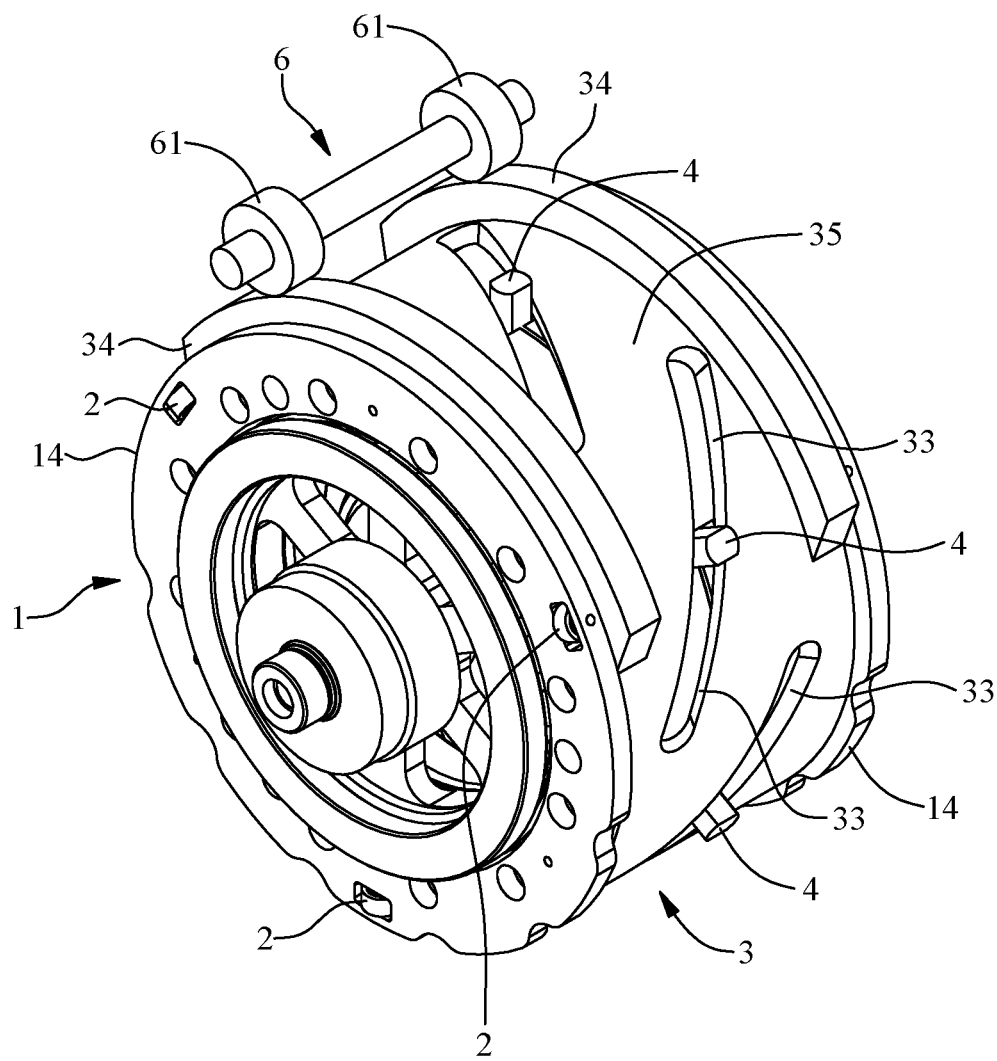
FIG. 4 is a schematic view 2 of the continuously variable transmission ring driving mechanism assembled according to a preferred embodiment of the present invention.
Figure 5:
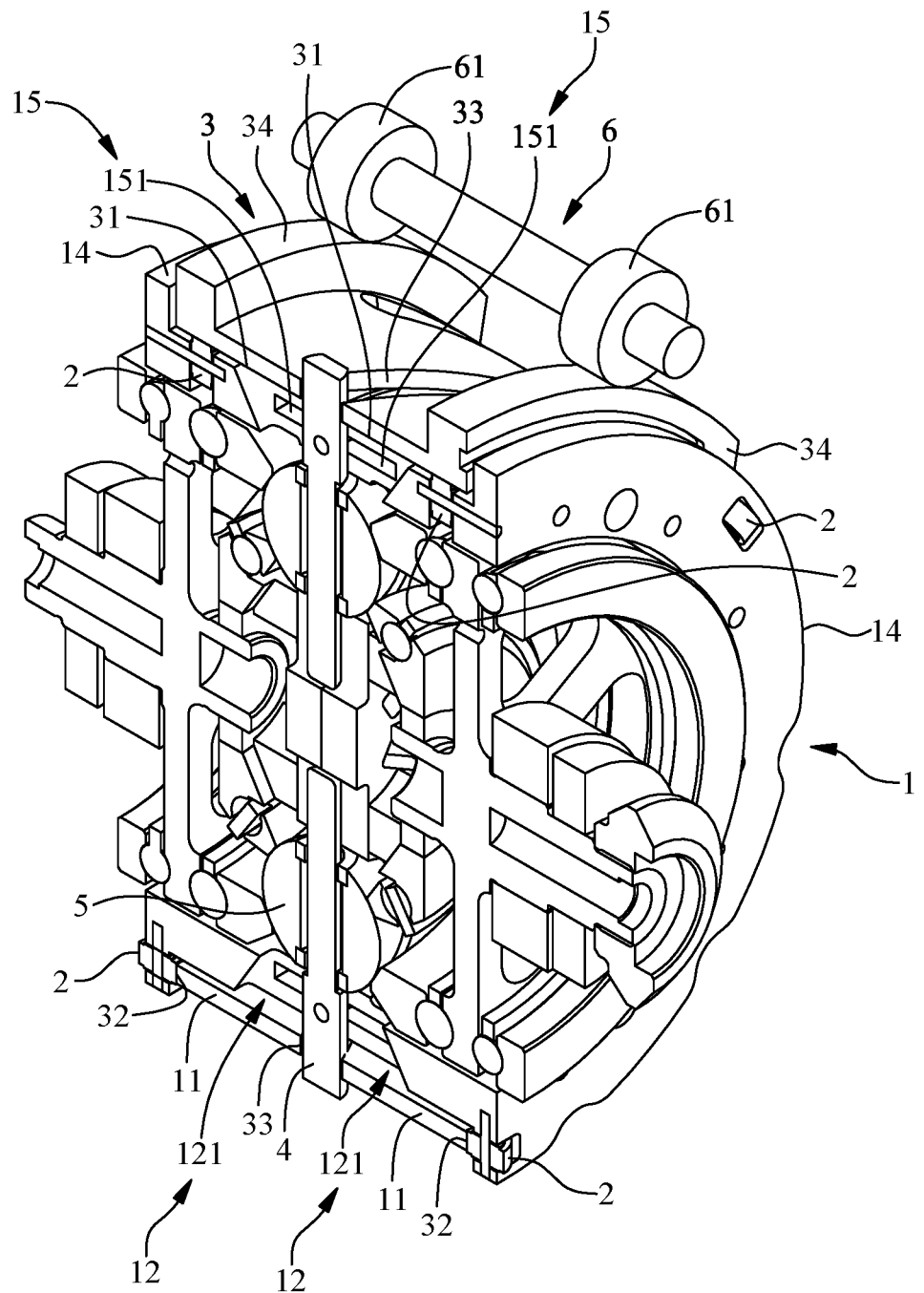
FIG. 5 is a cross-sectional view of FIG. 3.
Figure 6:
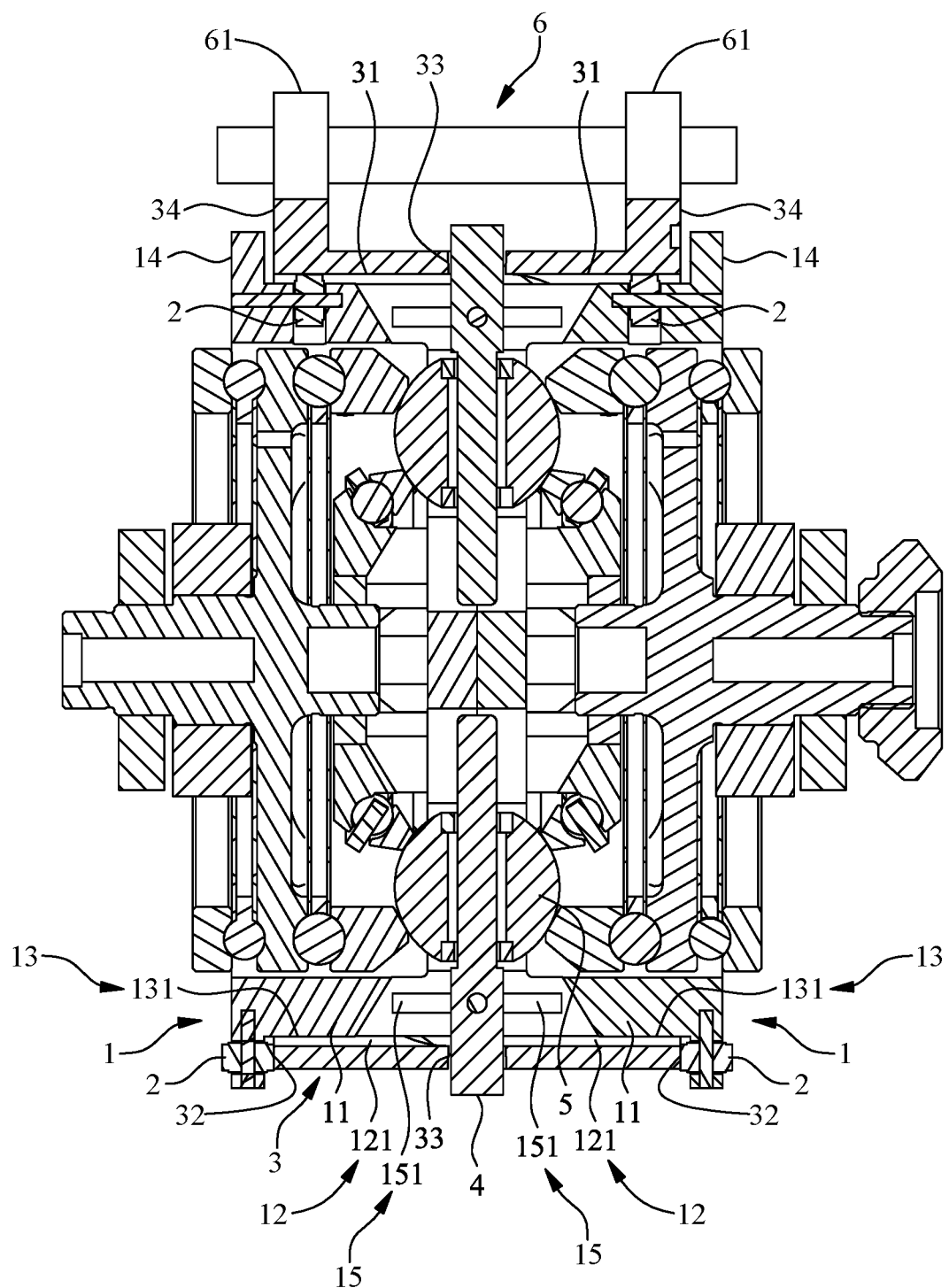
FIG. 6 is a front schematic view of FIG. 5.

Referring to FIG. 1, FIG. 3 and FIG. 6, as soon as the continuously variable transmission annular unit 3 rotates counterclockwise, the continuously variable transmission rod 4 moves rightward under the guidance of the axial guide holes 15 and the oblique guide holes 33, allowing the continuously variable transmission sphere 5 to turn rightward. Referring to FIG. 1, FIG. 3 and FIG. 6, as soon as the continuously variable transmission annular unit 3 rotates clockwise, the continuously variable transmission rod 4 moves leftward under the guidance of the axial guide holes 15 and the oblique guide holes 33, allowing the continuously variable transmission sphere 5 to turn leftward. With the continuously variable transmission annular unit 3 rotating about the cylinder 1 through the rollers 2, friction between the continuously variable transmission annular unit 3 and the cylinder 1 is restricted to rolling friction. Hence, the continuously variable transmission ring driving mechanism of the present invention has low friction loss and thus high efficiency of variable transmission.

Figure 2:
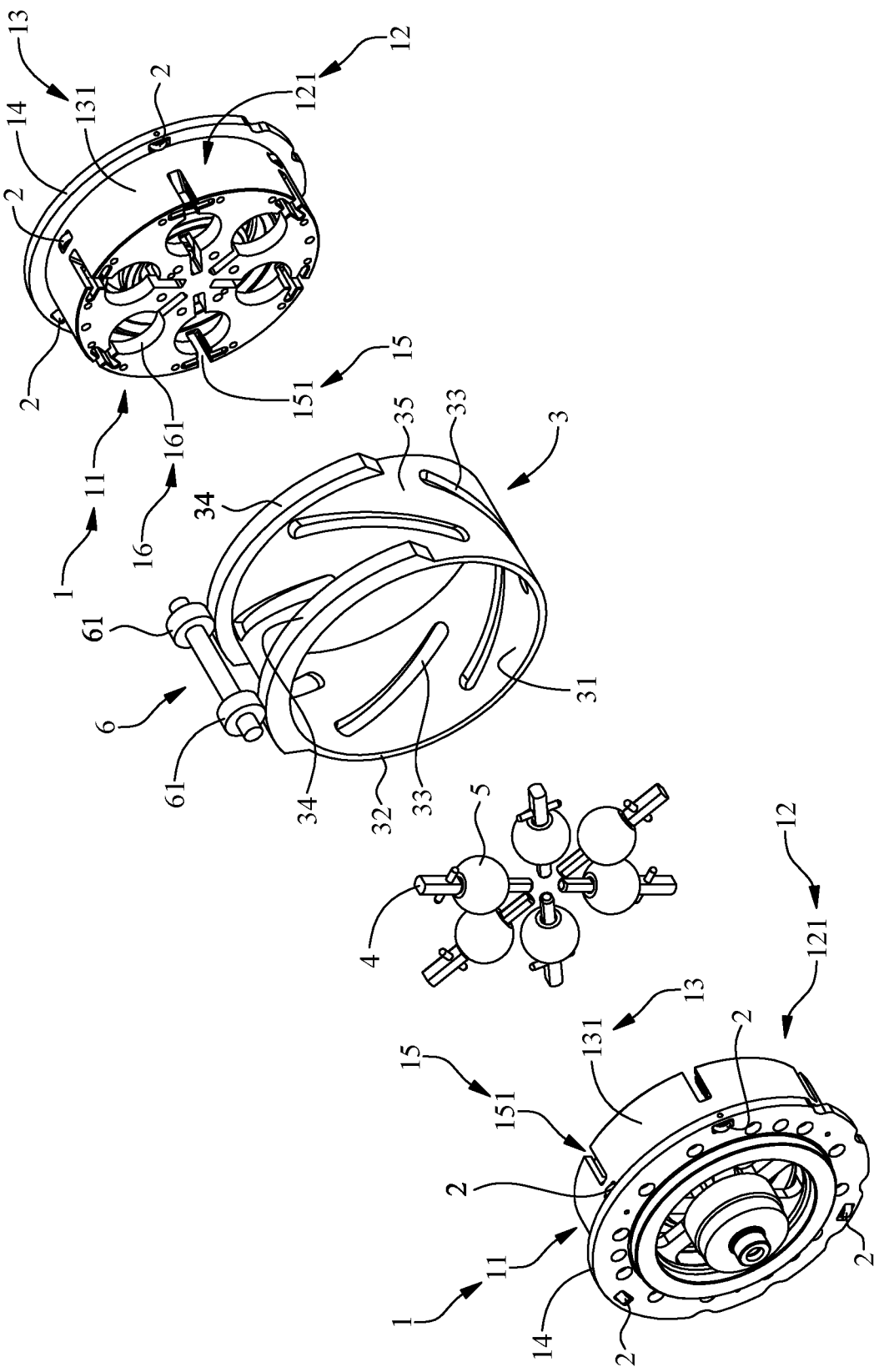
FIG. 2 is an exploded view 2 of the continuously variable transmission ring driving mechanism according to a preferred embodiment of the present invention.

Referring to FIG. 1 and FIG. 2, the cylinder 1 has two half-cylinders 11 connected together. The half-cylinders 11 each have a half ring-shaped bottom wall 131, a plurality of half axial guide holes 151, a plurality of half receiving holes 161, and the ring-shaped sidewalls 14. The two half ring-shaped bottom walls 131 are connected together to form the ring-shaped bottom wall 13. Every two adjacent half axial guide holes 151 are connected together to form a corresponding one of the axial guide holes 15 for receiving the continuously variable transmission rod 4. Every two adjacent half receiving holes 161 are connected together to form a receiving hole 16 for receiving the continuously variable transmission sphere 5. Hence, as soon as the continuously variable transmission annular unit 3 and the cylinder 1 are connected, the half-cylinders 11 are fitted in the continuously variable transmission annular unit 3 and then connected together to form the cylinder 1, such that the continuously variable transmission annular unit 3 and the cylinder 1 can be easily connected.

Referring to FIG. 1 through FIG. 6, the continuously variable transmission ring driving mechanism further comprises a driving source 6 for driving the continuously variable transmission annular unit 3 to rotate about the cylinder 1. At least one arcuate driving gear rack 34 is disposed on an outer ring-shaped surface 35 of the continuously variable transmission annular unit 3 and extended in the direction of rotation thereof. The driving source 6 has a servo motor (not shown) and at least one driving gear 61 for meshing with the arcuate driving gear rack 34. Hence, the continuously variable transmission ring driving mechanism of the present invention is characterized in that the servo motor drives the driving gear 61 and the arcuate driving gear rack 34, thereby driving the continuously variable transmission annular unit 3 to rotate about the cylinder 1.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A continuously variable transmission ring driving mechanism, comprising:
   a cylinder having a ring-shaped recess, the ring-shaped recess having a ring-shaped bottom wall and two ring-shaped sidewalls, the ring-shaped bottom wall having a plurality of axial guide holes each for receiving a continuously variable transmission rod;
   a plurality of rollers pivotally disposed at the ring-shaped bottom wall and the ring-shaped sidewalls and exposed partially from the ring-shaped recess; and
   a continuously variable transmission annular unit movably received in the ring-shaped recess, wherein an inner ring-shaped surface of the continuously variable transmission annular unit is in contact with the rollers of the ring-shaped bottom wall, and two opposing ring-shaped surfaces of the continuously variable transmission annular unit are in contact with the rollers of the ring-shaped sidewalls, the continuously variable transmission annular unit having a plurality of oblique guide holes, allowing the oblique guide holes to guide the continuously variable transmission rod along an axial direction of the cylinder when the continuously variable transmission annular unit rotates about the cylinder.

2. The continuously variable transmission ring driving mechanism of claim 1, wherein the cylinder has two half-cylinders connected together, the half-cylinders each having a half ring-shaped bottom wall, a plurality of half axial guide holes and the ring-shaped sidewalls.

3. The continuously variable transmission ring driving mechanism of claim 1, further comprising a driving source for driving the continuously variable transmission annular unit to rotate about the cylinder.

4. The continuously variable transmission ring driving mechanism of claim 3, wherein at least one arcuate driving gear rack is disposed on an outer ring-shaped surface of the continuously variable transmission annular unit and extended in a direction of rotation thereof, and the driving source has at least one driving gear meshing with the arcuate driving gear rack.

* * * * *